United States Patent
Menzel et al.

(10) Patent No.: US 6,994,068 B2
(45) Date of Patent: Feb. 7, 2006

(54) ANTIVIBRATION DEVICE

(75) Inventors: Johannes Menzel, Stuttgart (DE);
Markus Keller, Leutenbach (DE);
Helmut Lux, Waiblingen (DE);
Christoph von Hiller, Stuttgart (DE);
Günter Wolf, Oppenweiler (DE);
Andreas Guip, Waiblingen (DE)

(73) Assignee: Andreas Stihl AG & Co, KG, Waiblingen (DE)

( * ) Notice: Subject to any disclaimer, the term of this patent is extended or adjusted under 35 U.S.C. 154(b) by 24 days.

(21) Appl. No.: 10/774,530

(22) Filed: Feb. 10, 2004

(65) Prior Publication Data

US 2004/0178551 A1    Sep. 16, 2004

Related U.S. Application Data

(63) Continuation-in-part of application No. 10/133,586, filed on Apr. 29, 2002, now abandoned.

(30) Foreign Application Priority Data

Apr. 28, 2001 (DE) .................. 101 21 029

(51) Int. Cl.
*F02B 75/06*  (2006.01)
(52) U.S. Cl. .................. 123/192.1; 123/41.7; 30/381
(58) Field of Classification Search ............ 123/41.7, 123/195 R, 192.1; 30/381
See application file for complete search history.

(56) References Cited

U.S. PATENT DOCUMENTS

| 3,849,883 | A  | 11/1974 | Kolorz ..................... 30/381 |
| 5,046,566 | A  | 9/1991  | Dorner et al. ............. 30/381 |
| 5,063,253 | A  | 11/1991 | Gansen et al. ............ 521/159 |
| 5,699,865 | A  | 12/1997 | Förderer et al. ......... 173/162.2 |
| 5,799,930 | A  | 9/1998  | Willett .................. 267/141.4 |
| 6,471,179 | B1 | 10/2002 | Tousi et al. ............. 248/635 |

*Primary Examiner*—Noah P. Kamen
(74) *Attorney, Agent, or Firm*—Walter Ottesen

(57) ABSTRACT

An antivibration device is mounted between a motor unit (1) having an internal combustion engine (2) and a vibration-insulated unit (3) of a portable handheld work apparatus (4) such as a motor-driven chain saw, cutoff machine, suction/blower apparatus or the like. The antivibration device (5) includes a vibration damper (6) made of foamed elastic material (7).

22 Claims, 7 Drawing Sheets

ANTIVIBRATION DEVICE

RELATED APPLICATION

This is a continuation-in-part application of U.S. patent application Ser. No. 10/133,586, filed Apr. 29, 2002, now abandoned and claims priority of German patent application 101 21 029.9, filed Apr. 28, 2001, the entire content of which is incorporated herein by reference.

BACKGROUND OF THE INVENTION

The internal combustion engine of a portable handheld work apparatus such as a motor-driven chain saw, a cutoff machine, suction/blower apparatus or the like generates oscillations in its rpm range. These oscillations are, for example, noticeable as vibrations in a handle for guiding the work apparatus. A further component of the oscillatory excitation is regularly generated by the tool which is driven by the engine. The tool can, for example, be a saw chain, a cutoff disc, a cutting knife or the like. The oscillations generated thereby in the handle can lead to a premature tiring of the operator.

The motor unit of a portable handheld work apparatus and a unit, which is isolated relative to the work apparatus with respect to vibration (for example, with a handle), have comparatively small masses in order to make it possible to easily carry the apparatus and to easily guide the same with the hand during operation. The small light drive motor is operated at high engine speed (rpm) to generate an adequate drive power. Because of the low rotational inertial forces of the small drive motor, its idle rpm is also comparatively high. In total, an excitation frequency spectrum results which is high. The excitation force amplitudes are likewise high because of the uneven engine running of the mostly one-cylinder drive motor referred to the weight forces of the components to be insulated.

There are many embodiments of work apparatus known wherein, for example, a handle is fixed to the motor unit of the work apparatus via an antivibration device. The antivibration device is intended to provide vibration insulation of the handle from the motor unit. One such antivibration device includes a rubber vibration damper with combined elastic and damping characteristics. A decoupling of vibration can be adjusted via a targeted dimensioning of the elastic characteristics. A portion of the vibration amplitudes, which are transmitted nonetheless to the handle element, can be damped by the material characteristics of the rubber.

The essentially non-linear material characteristics of the rubber can be disadvantageous in this context. For example, the stiffness of a rubber element increases with larger deflections and is essentially caused by its significant transverse expansion. As a consequence, the resonance frequency of the vibrating system made up of the motor unit, the handle, the intermediately connected antivibration element or device changes in dependence upon the preload and the vibration amplitude. An adaptation of the resonance frequency to the operating frequency range of the work apparatus is therefore difficult. An operation of an antivibration element of this kind in a quasi-linear range is only possible for a correspondingly large configuration of the antivibration element for which sufficient mounting space is not always available. High operating loads or tight spatial conditions require the arrangement of a vibration damper, for example, in a sleeve, which prevents the transverse expansion of the damper material. Blocking the transverse expansion leads, with rubber, to a considerable stiffening, which makes an adaptation to the excitation frequencies to be dampened difficult.

A further disadvantage of rubber as a material for a damping element lies in its frequency-dependent stiffness. At high frequencies, the elasticity module of the rubber material increases. An increased inherent frequency can adjust which leads to resonances at the comparatively high excitation frequencies. Under unfavorable conditions, the resonance frequency can even migrate with the excitation frequency. Unwanted resonances over a wide excitation frequency range can occur. For an adequate vibration decoupling at high excitation frequencies, a very soft dimensioning of the antivibration element is required, which, under some circumstances, can lead to an excessively soft connection of the handle element to the motor unit. A clean guidance of the work apparatus is therefore hindered.

Further disadvantages can occur because of the stiffening of the rubber material at low temperatures or because of deterioration. A constructively pregiven vibration decoupling can then, under some circumstances, no longer be achieved in practice.

In alternate embodiments, antivibration elements having steel springs are known whose spring characteristics are essentially constant or linear. However, the low material damping of the steel is here disadvantageous and can lead to unwanted resonances. An antivibration element having a vibration damper of steel is furthermore sensitive with respect to material fatigue.

U.S. Pat. No. 6,471,179 discloses to use isolation elements made of a polyurethane foam for a vibration-damping attachment of a vehicle chassis to a vehicle body. A corresponding vehicle chassis can, especially in the loaded state, exhibit a considerable inherent weight which charges the isolation elements with a high static base load. The isolation elements must exhibit a correspondingly high carrying capacity.

The vibration-capable system, which is formed in this way, is subjected essentially to low-frequency excitations which can arise when driving on an uneven roadway. The low frequency excitations caused by the roadway unevenness form an excitation spectrum which does not change with the loading state of the vehicle's body.

PU-foam isolation elements first become softer with increasing static loading until a stiffness minimum is reached. With a further increase of the static load, an increasing hardening then develops.

There is also a dynamic hardening for PU-foam isolation elements to be observed. For a dynamic, vibrating load, the stiffness increases with the load frequency. The increase of the dynamic stiffening is most pronounced at low frequencies.

For a correct static and dynamic dimensioning of the suspension of the vehicle body by means of PU-foam isolation elements, the PU-foam, in the unloaded state of the vehicle body, is so greatly statically pretensioned by its own weight that approximately the static stiffness minimum is reached. In combination with the empty mass of the vehicle body, a constructive pregivable inherent frequency of the vibration-capable system adjusts.

In the loaded state, the mass of the vehicle body and the static loading of the isolation elements are increased. The stiffness of the PU-foam increases. In combination with the increased mass of the vehicle body, the natural frequency can at least be held approximately constant independently of the static loading state. The natural frequency of the vibration system can be determined under static considerations.

However, the PU-foam damper performs in this range like a conventional rubber damper whose stiffness likewise increases with the static load. With respect to the dynamic matching, no special advantages can be achieved with the use of a PU-foam damper compared to a rubber damper.

The high static loading because of the weight force of the vehicle body requires a sturdy dimensioning of the elastic dampers. Compared to the low-frequency excitation when traveling over uneven ground, a high natural frequency of the vibrating vehicle body occurs. For the frequency range of a few Hz in question, the especially pronounced dynamic stiffness of the foam material here contributes to the increase of the natural frequency. The vehicle body is essentially subjected to an undercritical excitation.

Via the chassis of the vehicle, higher excitation frequencies can, however, also be transmitted to the vehicle body and unwanted resonances can occur.

This effect can be amplified when the PU-foam dampers are designed for low loads. For the unloaded vehicle body, the stiffness minimum of the foam material is not yet reached. With increasing loading of the vehicle body, the stiffness of the PU-foam becomes less. The natural frequency of the system drops. Low frequency excitations during travel over an uneven roadway can also lead to resonances. In this case, the use of the PU-foam dampers is even disadvantageous compared to rubber dampers.

SUMMARY OF THE INVENTION

It is an object of the invention to provide an antivibration element of a portable handheld work apparatus with an improved damping effect.

The antivibration device of the invention is between a motor unit including an internal combustion engine and a vibration-insulated unit of a portable handheld work apparatus including a motor-driven chain saw, cutoff machine, suction/blower apparatus or the like. The antivibration device includes: a vibration damper interposed between the units and the vibration damper being made of a foamed elastic material.

For the above, the antivibration device in a portable handheld work apparatus is provided with a vibration damper made of foamed elastic material. It is practical to provide the elastic material in the form of a microporous polyurethane foam whose pores have a volume portion in the range of between approximately 50 and 65% of the total volume. The pore size of the polyurethane foam is less than 0.2 mm and is especially less than 0.1 mm. The specific weight of the foamed material advantageously lies in the range between 350 kg/m$^3$ and 650 kg/m$^3$.

The portable handheld work apparatus has only a low mass to facilitate carrying and guiding the apparatus. The low mass forces generate only a low static preload in the corresponding antivibration element. At standstill of the drive motor or at idle, only low hand forces are developed. Overall, only a slight static base load develops in the vibration damper.

For an effective damping of the excitation vibrations, which are generated during idle of the drive motor, the antivibration element can be so designed that the natural frequency of the vibration system lies below the idle-caused excitation frequency. A lower excitation frequency does not occur in a handheld portable work apparatus. The vibration system is subjected only to an overcritical excitation. A reliable and effective vibration decoupling is provided during idle operation.

The idle rpm of the drive motor of a portable handheld work apparatus is comparatively high and typically lies in the range of between 2,500 and 3,000 rpm. Even while maintaining an overcritical excitation, the damping element can be designed so stiff because of the high idle excitation frequency that a reliable guidance of the work apparatus during idle operation is possible at low mutual deflection of the components to be isolated. A good vibration isolation in combination with a precise, non-yielding guidability of the work apparatus is achieved in idle operation.

These advantages remain also when applying an external operating load. In a start situation at idle operation, the foamed material of the comparatively stiffly designed damper is loaded only by low mass and manual forces. The foam material is in a characteristic line region wherein additional static forces lead to a reduction of the static stiffness.

Starting from this situation, the portable handheld work apparatus can be subjected to an external operating load. For the example of a motor driven chain saw, the rpm is increased and, if required, up to the maximum rpm, and then the guide bar is applied with the cutting chain against the material to be cut. To execute the cut, an additional manual force is applied.

The increased rpm of the drive motor and also the cutting operation of the saw chain, which runs at high speed, generates an excitation frequency clearly increased compared to idle. It has been surprisingly shown that this high frequency excitation does not lead to an unwanted stiffening of the foamed damper element. Rather, the expected dynamic increase of the stiffness is compensated in that the static stiffness decreases as a consequence of the increased manual force. Both effects balance each other at least approximately. The natural frequency of the vibration system remains approximately constant. Starting from the good vibration decoupling in idle, the spacing of the excitation frequency to the natural frequency, which is pregiven from construction and remains constant, increases under operating load. The increased distance leads to an improved decoupling of vibration during operation.

The precision of guiding the work apparatus is also advantageously influenced. The vibration damper, which is configured in accordance with the invention, has a high stiffness which makes possible a good, non-yielding guidance of the work apparatus. The loss of static stiffness (which, for example, is introduced because of an operation-caused increase of the manual force) is compensated by the dynamic stiffening as a consequence of the high frequency operating load. The high base stiffness of the vibration damper is maintained under operating load. The work apparatus can be precisely guided.

The suggested material exhibits low fatigue. The transverse expansion of the material is low when there is a longitudinal load especially because of the compressibility of the pores. The stiffness of the antivibration element can be dimensioned adequately high for a reliable guidance of the work apparatus. The slight transverse expansion of the material also permits the use of corresponding antivibration elements in spatially tight mounting surroundings. Generally, a small dimension of the vibration damper can be achieved. The temperature influence on the material characteristics is also low especially when utilizing polyurethane foam so that also a good damping effect can be achieved in an increased temperature range, for example, from −40° C. to approximately 110° C.

In a practical embodiment, the vibration damper is especially restrained with respect to its transverse expansion by a sleeve surrounding the vibration damper. With a corresponding configuration of the sleeve or of a corresponding formed part, a high mechanical loadability of the antivibration device and especially the avoidance of unwanted thrust deformations is provided. The wanted spring characteristics are retained also in a closed mounting space because of the low transverse expansion, especially of the elastic polyurethane foam.

In an advantageous embodiment, ribs are formed from the foamed elastic material and extend radially on the peripheral side of the vibration damper. In the assembled state, the vibration damper is held at the ribs at the peripheral side and thereby intermediate spaces between the ribs remain. The vibration damper can be held in a clamp-like manner by radially pretensioning the ribs. This provides a compact configuration wherein the ribs can deform unhindered under load. For radial loads, some of the ribs are compressed while the opposite-lying ribs are relaxed from the pretensioning. The ribs experience an unhindered thrust deformation with axial loading. A wanted linear spring/damper characteristic of the vibration damper is facilitated.

An easy assembly results with a practical configuration wherein one of the two units, which are to be isolated, has a lug which is passed through a holding opening of the vibration damper and which has a latch projection for axially holding the vibration damper. The latch projection can be configured to be resilient but this need not be the case. The elastic vibration damper can be simply pushed onto the lug without complexity and the elasticity also permits passing the latch nose to be pushed through.

In a practical embodiment, a vibrating system is formed from the motor unit, which is the unit insulated with respect to vibration by the antivibration device, and the vibration device itself. The resonance frequency and especially the $\sqrt{2}$-multiple of the resonance frequency of this vibrating system lies below the lower limit of the frequency range which is to be damped. The lower limit of the frequency range, which is to be damped, is defined by the idle rpm of the engine. In this way, the work apparatus is operated in the so-called overcritical range in that the enlargement function of the vibrating system lies below 100%. The vibration level at the vibration insulated unit such as a handle or the like is low in this way over the entire operating range of the engine.

In an advantageous embodiment, the vibration-insulated unit is a handle unit connected via the antivibration element to the motor unit. The handle unit is charged with only a slight frequency level. The motor unit itself can, however, be aligned rigidly, with respect to the work tool to be driven. As a consequence, misalignments are avoided.

In an advantageous embodiment, and in addition to the vibration damper made of foamed elastic material, the antivibration element includes a metal spring, especially a spring made of steel. The combination of both elements generates a fail-safe function. With a rupture of one of the two elements, the remaining element in each case defines a reliable connection of the two components to be isolated. Furthermore, the different vibration characteristics and damping characteristics supplement each other in an advantageous manner. The good elasticity of the metal spring is supplemented by the damping characteristics of the foamed material.

The metal spring and the vibration damper are connected parallel to each other. Both elements experience approximately the same deflection. The load and the damping effect in both components can be adapted by adapting and selecting different stiffnesses for the two components.

The vibration damper made of foam material can advantageously be built in pretensioned. By selecting the corresponding pretensioning, the tension-dependent stiffness of the damping material can be influenced. Vibration characteristic and damping characteristic can be adapted with simple means. To develop the pretension force, a pretension force of the metal spring is especially suitable. Both elements can be pretensioned against each other under pressure. A vibrating load leads to a vibrating change of the pretension pressure force without a change developing between pressure force and tension force. Such a change could be disadvantageous under some circumstances.

In a practical embodiment of the above-mentioned variation, the metal spring is configured as a helical spring having a longitudinal axis. The vibration damper is arranged at least approximately coaxially to the helical spring. This results in a compact, space-saving configuration. The coaxial configuration avoids asymmetries in the introduction of force. The helical spring and the vibration damper are essentially loaded free of tilting. There results a low tension level as a consequence of which an overall small but effective antivibration element can be built up.

At least at one of its ends, the helical spring is held on a threaded lug which accommodates turns of the spring. This results in a reliable force introduction in all spatial axial directions. In addition to pressure forces, tension forces can also be introduced. The assembly can take place in a simple manner via a simple threadable engagement of the helical spring on the threaded lug.

In a practical embodiment, the metal spring is mounted at one end of the handle unit and the vibration damper is mounted on the opposite-lying end of the handle unit. There results an elastic parallel connection of both components with an overall low requirement of space. The mutually opposite arrangement of the two components leads to the situation that the motor housing extends laterally over the handle unit in the corresponding region and so leads to a protecting covering. In combination with the coaxial configuration, the helical spring and the damping element form a continuous unit having a force introduction into the handle unit at both ends with the introduction of this force being free of tilting.

The combination of helical spring and damping element made of foamed elastic material leads also to a positive mutual enhancement of the vibration characteristics and damping characteristics in that, in the axial direction of the helical spring, the good spring effect thereof can be used. Transverse to the axial direction, the helical spring has a comparatively low spring stiffness which can be compensated in an advantageous manner by the elastic vibration damper with a correspondingly higher stiffness.

In an advantageous variation, the metal spring is attached by means of a pivot joint to the motor unit and/or to the vibration-insulated unit. The pivot joint avoids the introduction of a torque into the motor unit and/or into the vibration-insulated unit. Excessive force peaks are avoided. Also, the helical spring itself is only loaded in the axial direction and is free of transverse forces and torques. There results, in a wanted manner, a linear spring characteristic path with corresponding favorable vibration characteristics and damping characteristics while avoiding unwanted load peaks. Occurring transverse forces are taken up by the foamed vibration damper. The above-described advantageous characteristics of the vibration damper become effective without being affected by the helical spring. Different vibration characteristics and damping characteristics can be constructively adjusted for different load directions. Inclined positions of the metal spring because of space requirements can be realized without a need for additional space.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
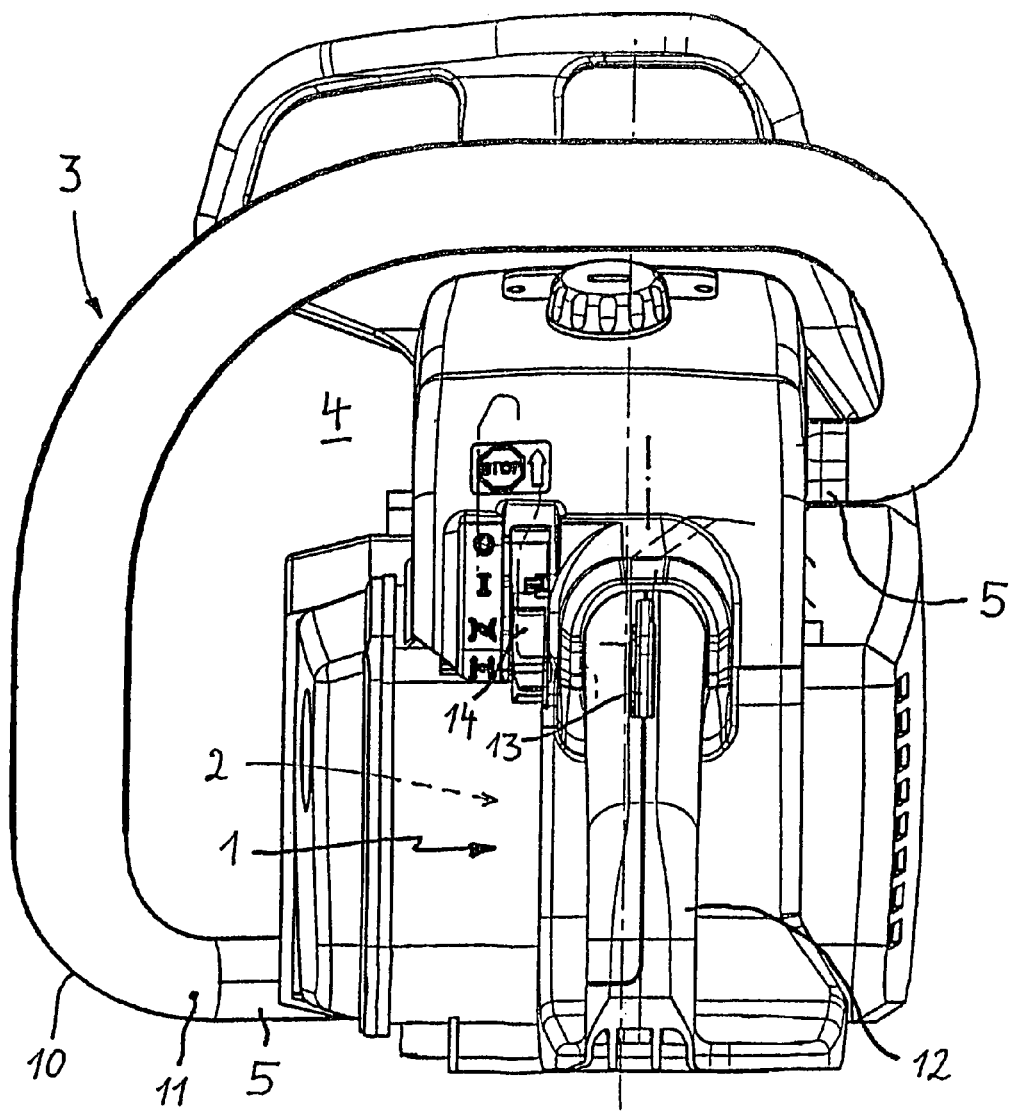
FIG. 1 is a rearward end view of a motor-driven chain saw by way of example having a motor unit and a tubular handle fixedly mounted thereon via antivibration elements.

FIG. 1 shows a rearward view of a portable handheld work apparatus 4, such as a motor-driven chain saw. The work apparatus 4 can also be a cutoff machine, a suction/blower apparatus, a brushcutter or the like. The work apparatus 4 includes a motor unit 1 having an internal combustion engine 2. A rearward handle 12 is mounted on the motor unit 1 and includes a lock lever 13 for a throttle lever (not shown) as well as an actuating lever 14 for an automatic stop of the engine 2. A handle unit 10 in the form of a tubular handle 11 is fixed to the motor unit 1 with two antivibration elements 5. The tubular handle 11 thereby defines a vibration-insulated unit 3. A common configuration of a tubular handle 11 and of the handle 12 as a vibration-insulated handle unit 10 can also be practical. A further possibility comprises fixing the engine 2 in the apparatus housing via antivibration elements 5 whereby the apparatus housing together with the handle unit 10 becomes a vibration-insulated unit 3. The motor unit 1 can also be, for example, the unit made up of an internal combustion engine and a guide tube of a brushcutter wherein a handle bracket or a guide handle is fixed to the guide tube via an antivibration element 5 according to the invention.

Figure 2:
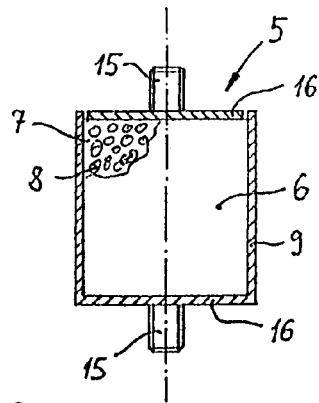
FIG. 2 is a schematic of an antivibration element having a vibration damper enclosed in a sleeve.

FIG. 2 is a schematic showing an antivibration element 5 corresponding to FIG. 1. The antivibration element 5 has a vibration damper 6. Plates 16 having respective threaded pins 15 for fixing the antivibration element 5 are arranged at respective ends of the vibration damper 6 in the axial direction. One of the end plates 16 is configured as one piece with a sleeve 9 enclosing the vibration damper 6. The transverse expansion, which is caused by an axial loading of the vibration damper 6, is prevented by the sleeve 9. In lieu of the sleeve 9, a wall of the tubular handle 11 or of the apparatus housing of FIG. 1 can be provided. In the embodiment shown, the vibration damper 6 has a cylindrical shape but can have any desired other suitable form depending upon the application. For example, the vibration damper 6 can have an irregular form. The vibration damper 6 is manufactured from a foamed elastic material 7 which is an elastic polyurethane foam in the embodiment shown. The polyurethane foam has pores 8 whose volume portion of the total volume of the elastic material 7 is preferably between 50 and 65% and is approximately 60% in the embodiment shown. The elastic material 7 is microporous with a pore size which is less than 0.2 mm and especially less than 0.1 mm. The specific weight of the foam material 7 lies in a range between 350 kg/m³ and 650 kg/m³.

Figure 3:
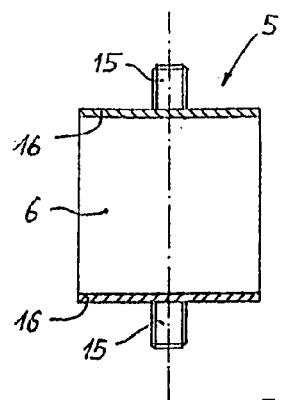
FIG. 3 is a variation of the antivibration element of FIG. 2 showing a vibration damper unrestrained in its transverse expansion.

FIG. 3 shows a variation of the antivibration element 5 of FIG. 2 wherein the vibration damper 6 is held between two plates 16 having respective threaded pins 15. Especially with the omission of a sleeve 9 (FIG. 2) surrounding the vibration damper 6, a transverse expansion of the vibration damper 6 is possible for an axial load as well as for a thrust deformation.

Figure 4:
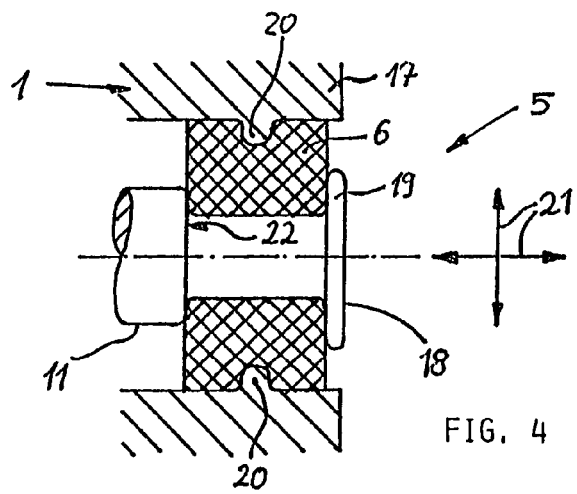
FIG. 4 is another variation of an antivibration element having a vibration damper essentially pressure loaded.

A further embodiment of an antivibration element 5 is shown in FIG. 4 wherein the vibration damper 6 is mounted between an end 18 of the tubular handle 11 and a housing 17 of the motor unit 1. A bent-over flange 19 is provided at the end 18 of the tubular handle 11. The housing 17 includes a peripherally extending annular bead 20. The vibration damper 6 is held form-tight by the flange 19, the annular bead 20 and an offset or step 22 in the tubular handle 11. The arrangement shown permits vibration degrees of freedom essentially in the direction of double arrows 21 wherein the vibration damper 6 is primarily subjected to pressure stresses.

Figure 5:
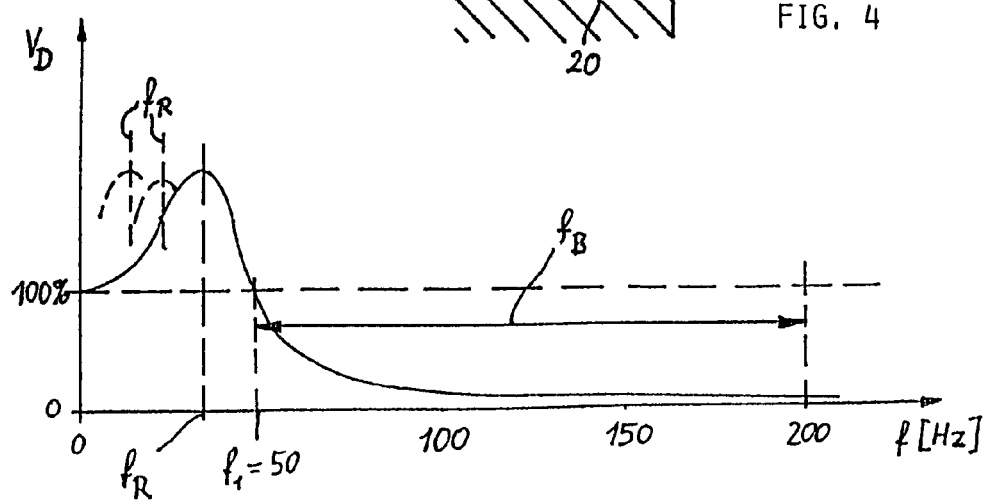
FIG. 5 is an exemplary illustration of an enlargement function $V_D$ of the arrangement of FIG. 1 as a function of frequency (f)

The motor unit 1 and the tubular handle 11 with the intermediately disposed antivibration elements 5 of FIG. 1 form a vibrating system whose vibration excitation takes place essentially because of the engine 2 and the saw chain (not shown). The vibration response in the tubular handle 11 dependent upon the excitation frequency is shown, by way of example, in the form of a diagram in FIG. 5. The trace of the vibration response is shown as an enlargement function $V_D$ referred to the 100% line of the excitation amplitude. The useable rpm range of the engine 2 of FIG. 1 lies between the idle rpm of approximately 3,000 rpm and the full-load rpm of approximately 12,000 rpm. This corresponds to an excitation frequency range $f_B$ from 50 to 200 Hz to be damped. The excitation frequency range of the saw chain lies, in the embodiment shown, in the range between 50 and 80 Hz and therefore within the frequency range $f_B$ which is generated by the engine 2.

The vibrating system includes several resonance frequencies $f_R$ and is shown in such a manner that its highest resonance frequency $f_R$ amounts to approximately 30 Hz. Accordingly, the $\sqrt{2}$-multiple of the highest resonance frequency $f_R$ lies slightly below the lower limit $f_1$, of the frequency range $f_B$, which is to be damped, at a level of 50 Hz. At excitation frequencies above the $\sqrt{2}$-multiple of the resonance frequency $f_R$, the enlargement function $V_D$ runs below the 100% line as a consequence of which the vibration amplitude in the vibration-insulated unit 3 (FIG. 1) is less than the excitation amplitude and whereby an effective vibration damping is given in the vibration-insulated unit 3. The structural components of the work apparatus 4 of FIG. 1 such as the tubular handle 11, the handle 12 and the apparatus housing are dimensioned to be stiff so that their natural resonance lies above the excitation frequency range $f_B$. In this way, an effective vibration decoupling of the vibrating system from the natural vibrations of the individual structural components is given.

Figure 6:
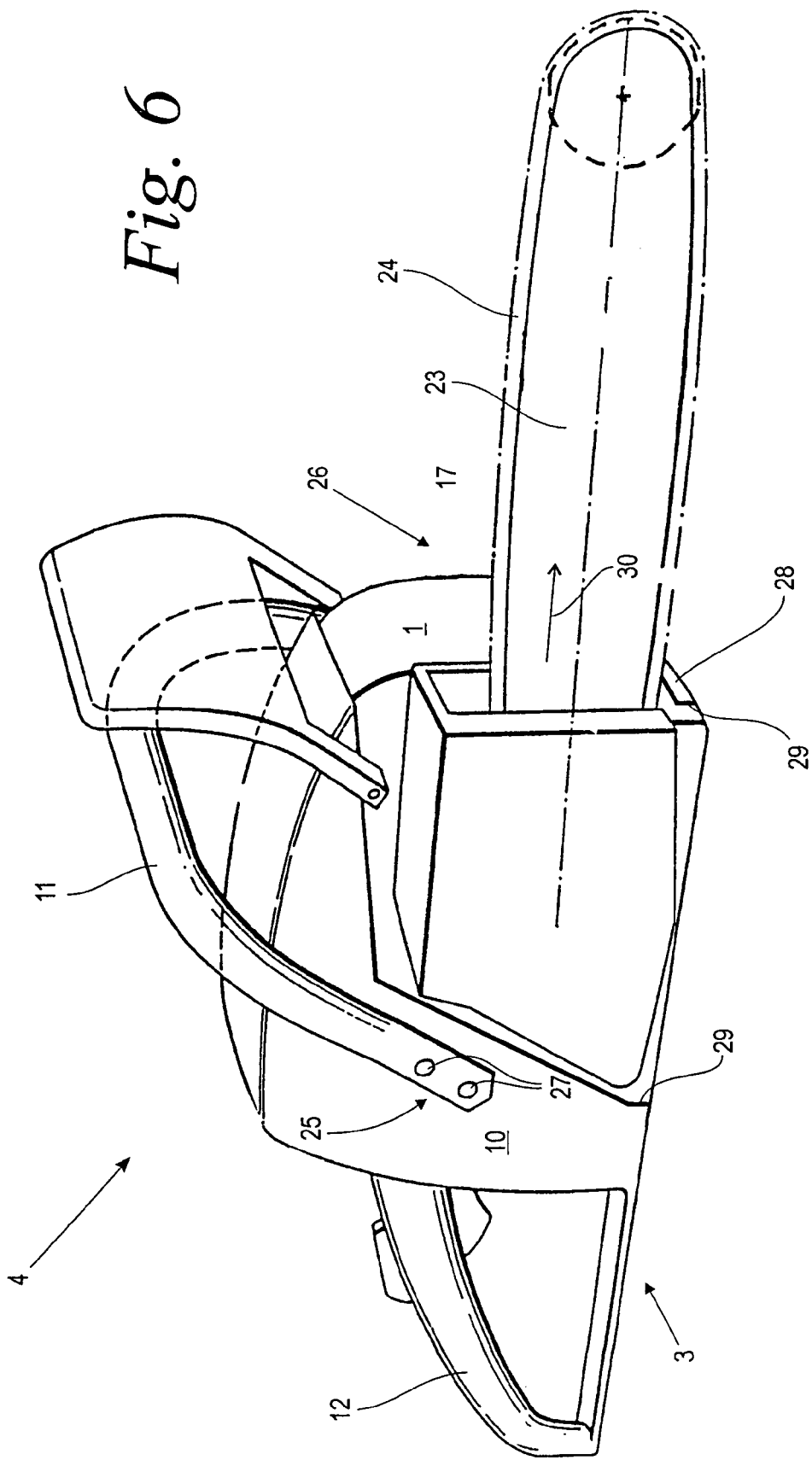
FIG. 6 is a schematic side elevation view of a motor-driven chain saw having a motor unit and a handle unit separated from the motor unit by a vibration gap.

FIG. 6 shows a perspective overview of a variation of the work apparatus 4 of FIG. 1 in the form of a motor-driven chain saw selected by way of example. The work apparatus 4 includes a motor unit 1 from which a handle unit 10 is separated by means of a vibration gap 29. The handle unit 10 is in the form of a vibration-insulated unit 3.

A guide bar 23 with a saw chain 24 running thereon is mounted on the motor unit 1. The guide bar 23 is mounted in the forward direction indicated by arrow 30.

The handle unit 10 includes a handle 12 at its rearward end. Between the handle 12 and the guide bar 23, a grip tube 11 is fixed at both its ends (25, 26) by means of attachment screws 27 to the handle unit 10. The grip tube 11 runs above and to the side of the handle unit 10 down to its lower end. There, the handle unit 10 has a longitudinally running carrier 28 which extends in the front direction 30. The longitudinal carrier 28 is enclosed laterally and upwardly by a housing 17 of the motor unit 1. The lower end 26 of the grip tube 11 is attached to the longitudinal carrier 28.

A vibration gap 29 also runs between the longitudinal carrier 28 and the motor unit 1 or its motor housing 17. The motor unit 1 and the handle unit 10 are connected to each other by means of antivibration elements 5 described in connection with FIGS. 7 to 12. The vibration gap 29 makes possible a free relative displacement of the two parts to each other.

Figure 7:
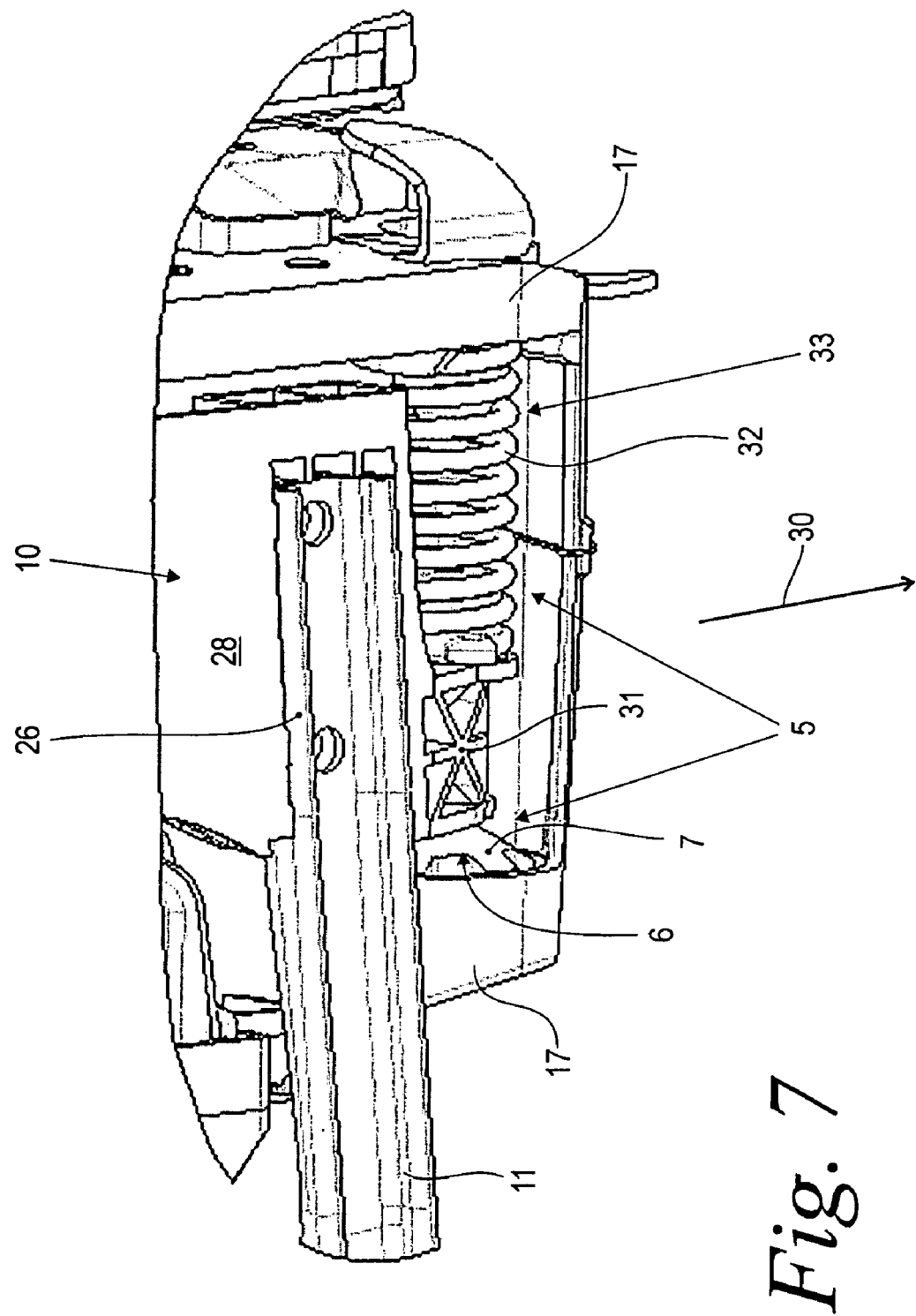
FIG. 7 is an enlarged detail bottom view showing the lower region of attachment of the handle tube to an antivibration element of the arrangement of FIG. 6.

FIG. 7 shows the arrangement of FIG. 6 in a bottom enlarged detail view. The front direction is given by the arrow 30. The lower end 26 of the grip tube 11 is threadably fastened to the longitudinal carrier 28 of the handle unit 10 via indicated screw holes.

At its forward end, the longitudinal carrier 28 has an attachment projection 31. A vibration damper 6, which is supported in the motor housing 17, is supported on one side of the extension 31 and is made of the elastic foamed material 7 described above. On the opposite side of the attachment projection 31, a metal spring 33 is provided by means of which the longitudinal carrier 28 is connected to the housing 17.

The metal spring 33 can be configured as a torsion spring, disc spring or other suitable spring element. In the embodiment shown, a configuration in the form of a helical spring 32 is selected. Spring steel has proven to be a suitable material.

Figure 8:
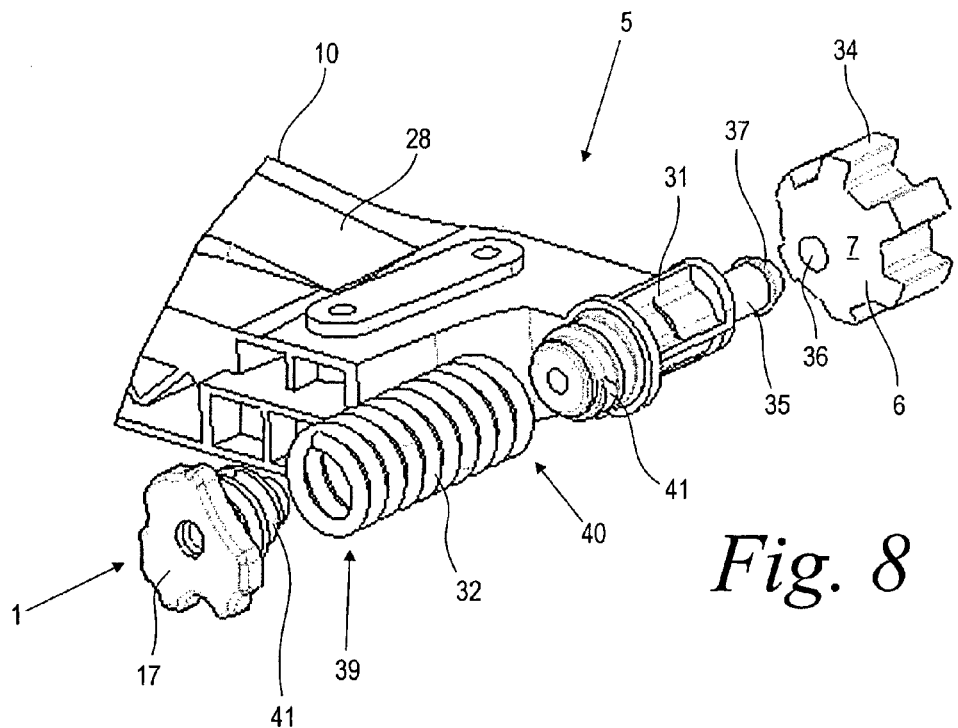
FIG. 8 is a perspective exploded view of details of the antivibration element of FIG. 7.

FIG. 8 shows details of the antivibration element 5 of FIG. 7 in a perspective exploded view. The attachment projection 31 is formed as one piece at the end face of the longitudinal carrier 28 of the handle unit 10. Laterally, the attachment projection 31 has a threaded lug 41 which is likewise formed thereon as one piece. A threaded lug 41, which is formed in the same manner, is fixed on the adjacent motor housing component 17. In the assembled state, an external thread on each of the threaded lugs 41 engages on the inner side of corresponding ones of the ends (39, 40) of the helical spring 32. The spring coil is taken up form-tightly at each end thereof by the threads.

A lug 35 is formed on the opposite-lying side of the attachment projection 31. The lug 35 has a peripherally-extending, conically-shaped latch projection 37. The vibration damper 6 is assigned to the lug 35 and is made of the elastic material 7 described above. The vibration damper 6 has a center holding opening 36. Radially projecting ribs 34 are formed on the peripheral side of the vibration damper 6 and are made of the foamed elastic material 7.

Figure 9:
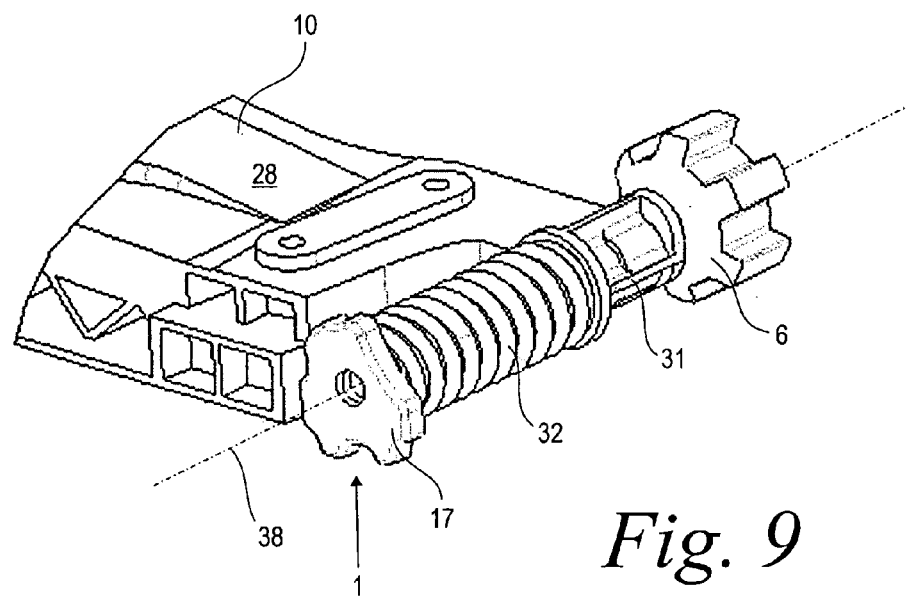
FIG. 9 shows the arrangement of FIG. 8 in the assembled state.

FIG. 9 shows the arrangement of FIG. 8 in the assembled state. The helical spring 32, the attachment projection 31 and the vibration damper 6 are arranged coaxially to the common longitudinal axis 38.

Figure 10:
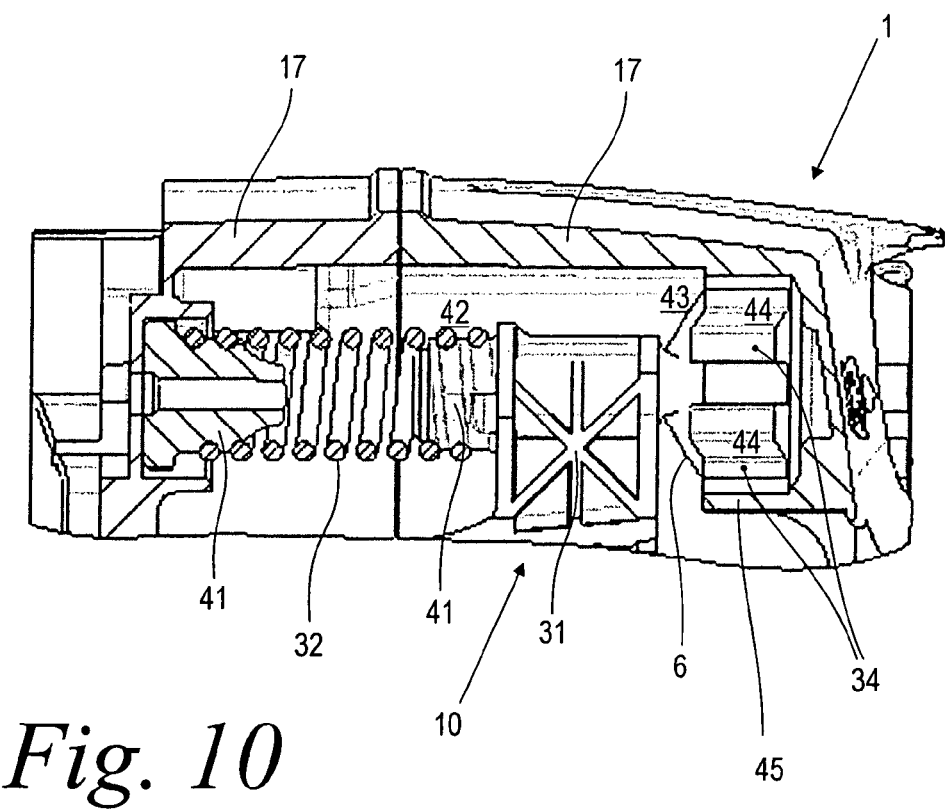
FIG. 10 is a section view of the arrangement of FIG. 7 in the region of the antivibration element.

FIG. 10 shows, in section, the arrangement of FIGS. 7 to 9 in the built-in state. The housing 17 of the motor unit 1 is configured as two parts and extends laterally over the attachment projection 31 of the handle unit 10. The attachment projection 31 is held on both sides between the housing parts 17 by the helical spring 32 and the vibration damper 6. The metal spring 33 is arranged on one side 42 of the handle unit 10 and the vibration damper 6 is arranged on the opposite-lying side 43 of the handle unit 10.

The helical spring 32 can be built in under axial pretensioning. The arising pretension pressure force transmits to the vibration damper 6 via the attachment projection 31. Correspondingly, the vibration damper 6, which is shown here in the built-in state, is also subjected to an axial pressure pretensioning.

The two threaded lugs 41 engage with their respective threads in the turns of the helical spring 32. The threaded lug 41 on the side of the attachment projection 31 is formed as one piece therewith. The opposite-lying threaded lug 41 is configured as a separate component.

The vibration damper 6 is pushed onto the lug 35 (FIG. 8) so as to latch and is held clampingly under radial pretensioning in a sleeve 45 of the motor housing 17. The radially projecting ribs 34 lie under pretensioning on the outside against the inner side of the sleeve 45. Intermediate spaces 44 remain between the ribs 34 and the outer-side sleeve 45.

A parallel connection of the helical spring 32 and the vibration damper 6 results from the two-ended arrangement of the helical spring 32 and the vibration damper 6 and their outer side fixation on the motor housing 17.

Figure 11:
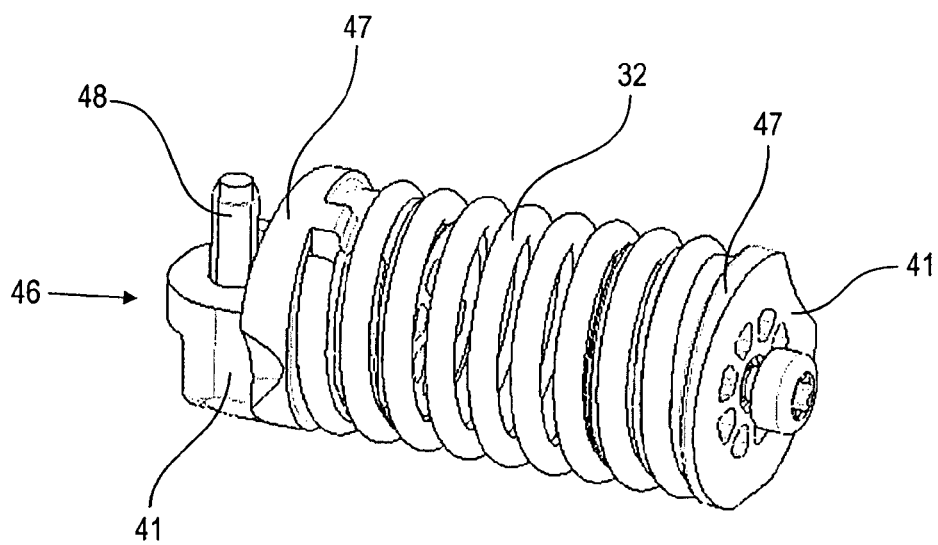
FIG. 11 is a perspective view showing a variation of the spring arrangement of FIG. 9 with a pivot joint; and, FIG. 12 shows a bottom view of the work apparatus of FIG. 6 with a pivoted spring element of FIG. 11 shown in an inclined position.

FIG. 11 shows a variation of the helical spring arrangement of FIGS. 7 to 10 in a perspective overview. The threaded lug 41, which faces toward the attachment projection 31, is provided with a lug 48 arranged transversely to the longitudinal axis of the helical spring 32. The lug 48 can be hooked into the attachment projection 31 (FIG. 10) so as to pivot therein. In this way, a pivot joint 46 is formed whereby the helical spring 32 can be mounted at different angles relative to the attachment projection 31 or to the handle unit 10. Both threaded lugs 41 have respective wedge plates 47 by means of which an angular compensation can be introduced during the assembly.

Figure 12:
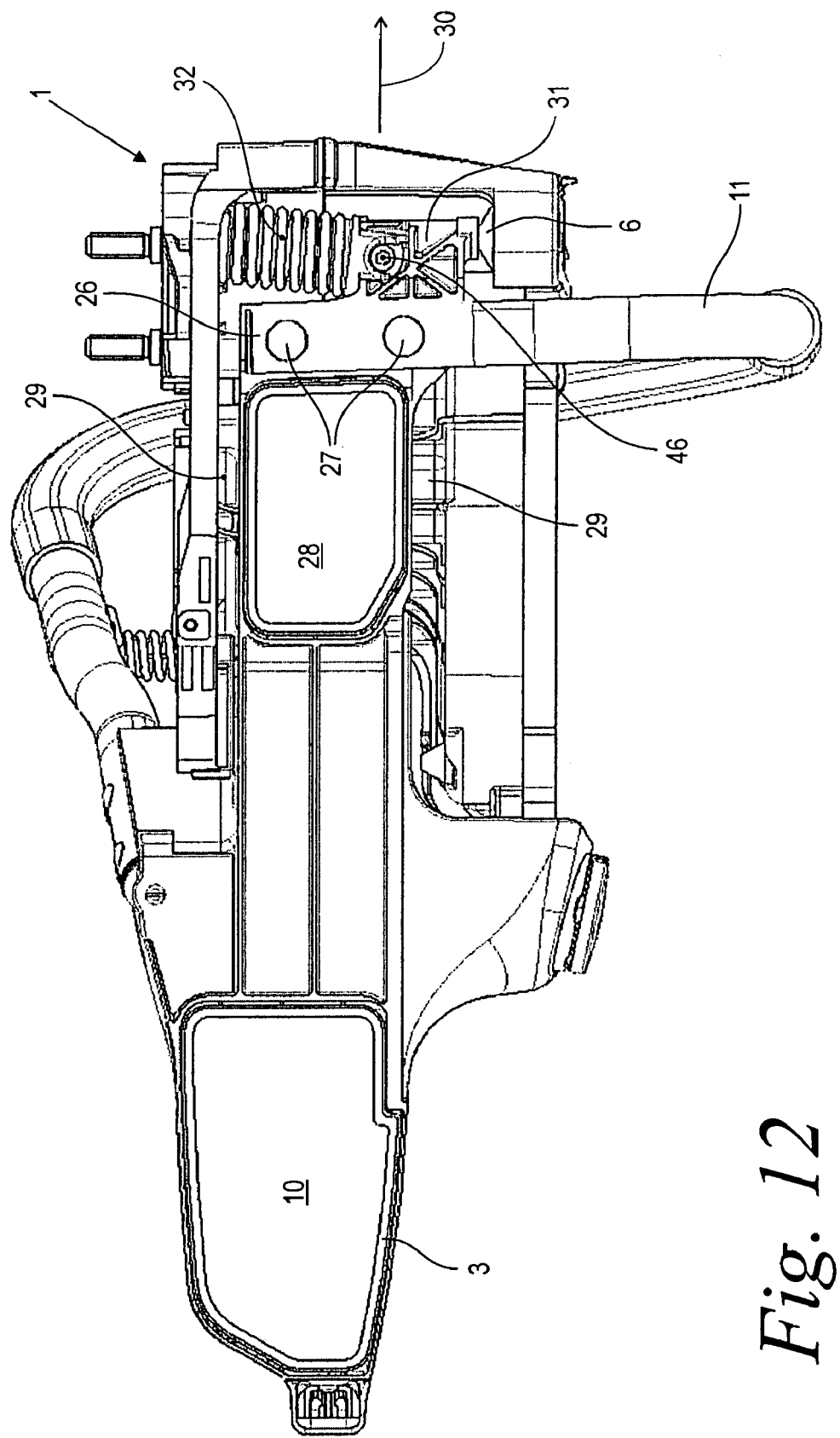

FIG. 12 shows a lower view of the work apparatus of FIG. 6 wherein the helical spring 32 is built-in inclined at an angle of approximately 7° referred to the perpendicular to the front direction 30. The inclined position of the helical spring 32 is compensated by the pivot joint 46 in such a manner that in the pivot joint 46, longitudinal forces can be introduced into the helical spring 32. In lieu of the pivot joint 46 shown or in combination therewith, a pivot joint 46 can be provided at the connection location between the helical spring 32 and the motor unit 1. The embodiment of FIG. 12 corresponds to the embodiment of FIGS. 6 to 10 with respect to the remaining features and reference numerals.

It is understood that the foregoing description is that of the preferred embodiments of the invention and that various changes and modifications may be made thereto without departing from the spirit and scope of the invention as defined in the appended claims.

What is claimed is:

1. An antivibration device between a motor unit including an internal combustion engine and a vibration-insulated unit of a portable handheld work apparatus including a motor-driven chain saw, cutoff machine, suction/blower apparatus or the like, the antivibration device comprising:

a vibration damper interposed between said units and said vibration damper being made of a foamed elastic material;

said vibration damper having a peripheral surface and including a plurality of radially projecting ribs formed on said peripheral surface and said ribs being made of said foamed elastic material; said ribs having peripheral surfaces; and, said antivibration device further including means for holding said vibration damper at said peripheral surfaces of said ribs when said vibration damper is in the built-in state so as to leave an intermediate space between each two mutually adjacent ones of said ribs.

2. The antivibration device of claim 1, wherein said foamed elastic material is a polyurethane foam.

3. The antivibration device of claim 2, wherein said elastic material is microporous and foamed with a pore size which is less than 0.2 mm.

4. The antivibration device of claim 2, wherein said elastic material is microporous and foamed with a pore size which is less than 0.1 mm.

5. The antivibration device of claim 1, wherein said foamed elastic material has pores and said pores constitute a volume portion in a range approximately from 50% to 65% of the total volume.

6. The antivibration device of claim 1, wherein said foamed elastic material has a specific weight lying in the range of 350 kg/m$^3$ to 650 kg/m$^3$.

7. The antivibration device of claim 1, further comprising a sleeve surrounding said vibration damper so as to hinder a transverse expansion of said vibration damper.

8. The antivibration device of claim 1, wherein said motor unit, said vibration-insulated unit and said antivibration device conjointly define a vibratory system having a resonance frequency ($f_R$) which lies below the lower limit ($f_1$) of a frequency range ($f_B$) to be damped.

9. The antivibration device of claim 8, wherein the $\sqrt{2}$-multiple of said resonance frequency ($f_R$) lies below said lower limit ($f_1$) of said frequency range ($f_B$) to be damped.

10. The antivibration device of claim 8, wherein said lower limit ($f_1$) of said frequency range ($f_B$) to be damped is defined by the idle rpm of said internal combustion engine.

11. The antivibration device of claim 1, wherein said vibration-insulated unit is a handle unit connected to said motor unit via said antivibration device.

12. An antivibration device between a motor unit including an internal combustion engine and a vibration-insulated unit of a portable handheld work apparatus including a motor-driven chain saw, cutoff machine, suction/blower apparatus or the like, the antivibration device comprising:

a vibration damper interposed between said units and said vibration damper being made of a foamed elastic material;

one of said motor unit and said vibration-insulated unit having a lug;

said vibration damper having an opening for accommodating said lug therein; and, said lug having a latch nose for axially securing said vibration damper.

13. An antivibration device between a motor unit including an internal combustion engine and a vibration-insulated unit of a portable handheld work apparatus including a motor-driven chain saw, cutoff machine, suction/blower apparatus or the like, the antivibration device comprising:

a vibration damper interposed between said units and said vibration damper being made of a foamed elastic material;

said vibration-insulated unit being a handle unit connected to said motor unit via said antivibration device;

a metal spring in addition to said vibration damper made of foamed elastic material;

said handle unit having first and second sides; and, said metal spring being mounted at said first side and said vibration damper being mounted on said second side.

14. An antivibration device between a motor unit including an internal combustion engine and a vibration-insulated unit of a portable handheld work apparatus including a motor-driven chain saw, cutoff machine, suction/blower apparatus or the like, the antivibration device comprising:

a vibration damper interposed between said units and said vibration damper being made of a foamed elastic material;

a metal spring in addition to said vibration damper made of foamed elastic material; and, said metal spring being operatively connected to said vibration damper to provide a pretensioning force therefor.

15. The antivibration device of claim 14, said metal spring being made of steel.

16. The antivibration device of claim 14, wherein said vibration damper and said metal spring are connected in parallel.

17. The antivibration device of claim 14, wherein said vibration damper is built in so as to be pretensioned.

18. The antivibration device of claim 14, wherein said vibration damper is pretensioned by a pretension force of said metal spring.

19. The antivibration device of claim 14, wherein said metal spring is configured as a helical spring defining a longitudinal axis; and, said vibration damper is mounted approximately coaxial to said helical spring.

20. The antivibration device of claim 19, further comprising a threaded lug for engaging the coil of said helical spring for holding said helical spring at at least one of the ends thereof.

21. The antivibration device of claim 14, further comprising a pivot joint for pivotally connecting said metal spring to one of said motor unit and said vibration-insulated unit.

22. The antivibration device of claim 14, further comprising first and second pivot joints for connecting said metal spring to said motor unit and said vibration-insulated unit, respectively.

* * * * *